(12) United States Patent
Wise (10) Patent No.: US 6,195,333 B1
(45) Date of Patent: Feb. 27, 2001

(54) UNFRAMED ISOCHRONOUS SHAPING METHOD TO REDUCE DELAY AND DELAY VARIATION IN A CBR TRANSMISSION SYSTEM

(75) Inventor: Jeffrey L. Wise, Acton, MA (US)

(73) Assignees: Fujitsu Network Communications, Inc., Richardson, TX (US); Fujitsu Limited, Kawasaki (JP)

( * ) Notice: Subject to any disclaimer, the term of this patent is extended or adjusted under 35 U.S.C. 154(b) by 0 days.

(21) Appl. No.: 08/958,542

(22) Filed: Oct. 27, 1997

Related U.S. Application Data (60) Provisional application No. 60/029,176, filed on Oct. 28, 1996.

(51) Int. Cl.[7] .................................................. H04L 12/56
(52) U.S. Cl. .......................................... 370/235; 370/395
(58) Field of Search ..................................... 370/230, 231, 370/232, 233, 234, 252, 253, 395, 396, 397, 412, 468, 229, 235, 236, 356, 503, 522; 709/332, 333, 334

(56) References Cited

U.S. PATENT DOCUMENTS

| | | | |
|---|---|---|---|
| 4,893,318 | * 1/1990 | Potash et al. .......................... 375/190 |
| 5,392,280 | * 2/1995 | Zheng .................................... 370/60 |
| 5,402,416 | * 3/1995 | Cieslak et al. .......................... 370/60 |
| 5,515,363 | * 5/1996 | Ben-Nun et al. ....................... 370/17 |
| 5,544,324 | * 8/1996 | Edem et al. ..................... 395/200.17 |
| 5,568,470 | * 10/1996 | Ben-Nun et al. ....................... 370/17 |
| 5,572,523 | * 11/1996 | Katsube et al. ..................... 370/60.1 |
| 5,602,830 | * 2/1997 | Fichou et al. ......................... 370/232 |
| 5,689,499 | * 11/1997 | Hullett et al. ......................... 370/235 |
| 5,729,529 | * 3/1998 | Martinsson ........................... 370/235 |
| 5,796,719 | * 8/1998 | Peris et al. ............................ 370/231 |
| 5,926,459 | * 7/1999 | Lyles et al. ........................... 370/230 |
| 5,936,964 | * 8/1999 | Valko et al. .......................... 370/468 |
| 5,953,336 | * 9/1999 | Moore et al. ......................... 370/395 |
| 5,995,486 | * 11/1999 | Iliadis .................................. 370/229 |

* cited by examiner

Primary Examiner—Chau Nguyen
(74) Attorney, Agent, or Firm—Weingarten, Schurgin, Gagnebin & Hayes LLP (57) ABSTRACT

Flow shaping is executed at each ATM device in a virtual circuit formed in an ATM network. More particularly, the flow of data units through the virtual circuit is controlled at each ATM switch such that the variable transmission delay remains substantially constant from hop to hop. Flow shaping at each device causes variable transmission delay to remain substantially constant throughout the virtual circuit, thereby allowing formation of an ATM virtual circuit having an arbitrarily large number of ATM switch "hops" without constraints imposed by required playout buffer size. Further, the invention minimizes end-to-end delay.

24 Claims, 7 Drawing Sheets

UNFRAMED ISOCHRONOUS SHAPING METHOD TO REDUCE DELAY AND DELAY VARIATION IN A CBR TRANSMISSION SYSTEM

CROSS REFERENCE TO RELATED APPLICATIONS

A claim of priority is made to U.S. Provisional Patent Application Ser. No. 60/029,176, entitled UNFRAMED ISOCHRONOUS SHAPING METHOD TO REDUCE DELAY AND DELAY AND DELAY VARIATION IN A CBR TRANSMISSION SYSTEM, filed Oct. 28, 1996.

STATEMENT REGARDING FEDERALLY SPONSORED RESEARCH OR DEVELOPMENT

Not Applicable

BACKGROUND OF THE INVENTION

The present invention is generally related to telecommunications apparatus, and more particularly to virtual circuits in telecommunications apparatus.

Voice carrying connection standards such as T1 and T3 multiplexed digital channels are well known. A T1 connection carries 24 standard voice channels and a T3 connection carries 28 T1 connections. T1 and T3 connections can also carry video signals and computer data. T1 and T3 are synchronous systems in which each individual voice connection has periodic time slots within which to transmit voice carrying data. Asynchronous systems, such as Asynchronous Transfer Mode ("ATM") networks, are also known. ATM networks can carry different types of data such as voice, video and computer data. However, while ATM systems are capable of transmitting voice data, the voice data is transmitted asynchronously.

Under some circumstances it is desirable to integrate synchronous networks and ATM networks. For example, voice data could be received by a first ATM switch from a "circuit" in a first synchronous network, propagated asynchronously to a second ATM switch through a "virtual circuit," and subsequently transmitted over a circuit in another synchronous network. In order to prevent gaps from occurring in the second synchronous network the second ATM switch must maintain a sufficient reserve of voice data units in a "playout buffer" to fill each time slot allocated to the voice connection in the second synchronous network with voice data. However, if the voice data units must be transmitted through many ATM switches, the amount of memory required to maintain a sufficient reserve of voice data units in the playout buffer can become prohibitively large. More particularly, as the number of intermediate ATM switches increases, the effect on variable transmission delay at each subsequent downstream ATM switch in the virtual circuit is cumulative.

BRIEF SUMMARY OF THE INVENTION

In accordance with the present invention, flow shaping is performed at each asynchronous device in a virtual circuit. More particularly, the flow of data units through the virtual circuit is controlled at each asynchronous device such that the variable transmission delay remains substantially constant throughout the virtual circuit.

Flow shaping at each switch in the virtual circuit facilitates use of Asynchronous Transfer Mode ("ATM") networks in association with synchronous networks. Flow shaping causes variable transmission delay to remain substantially constant throughout the virtual circuit. Further, because variable transmission delay remains substantially constant throughout the virtual circuit, the size of the playout buffer in the furthest downstream ATM switch need not be adjusted depending on the number of intermediate ATM switches in the virtual circuit. Hence, an ATM virtual circuit having an arbitrarily large number of intermediate ATM switch "hops" can be initiated without increasing the playout buffer size in the furthest downstream ATM switch.

BRIEF DESCRIPTION OF THE DRAWING

The invention will be more fully understood from the following Detailed Description of the Invention, in conjunction with the Drawing, of which.

DETAILED DESCRIPTION OF THE INVENTION

U.S. Provisional Patent Application Ser. No. 60/029,176, entitled UNFRAMED ISOCHRONOUS SHAPING METHOD TO REDUCE DELAY AND DELAY AND DELAY VARIATION IN A CBR TRANSMISSION SYSTEM, filed Oct. 28, 1996 is incorporated herein by reference.

Figure 1:
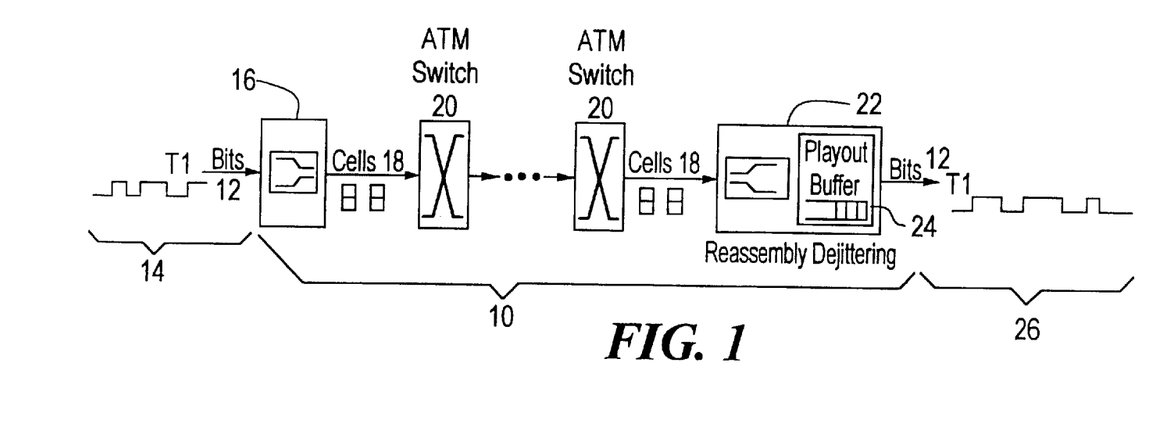
FIG. 1 is a block diagram of a virtual circuit.

FIG. 1 illustrates a virtual circuit in an Asynchronous Transfer Mode ("ATM") network 10. Voice data bits 12 enter the ATM network 10 through a synchronous connection, such as a T1 connection, associated with an ingress synchronous network 14. More particularly, the voice data bits 12 enter a segmentation device 16 in the ATM network. The segmentation device 16 translates the voice data bits into ATM cells 18. The ATM cells 18 are forwarded through a plurality of ATM switches 20 in the ATM network 10. Eventually, the ATM cells are transmitted to a reassembly device 22. The reassembly device 22 translates the ATM cells back into voice data bits. Reassembled voice data bits are queued in a FIFO-type playout buffer 24 and synchronously transmitted via a synchronous connection, such as a T1 connection, associated with an egress synchronous network 26. The flow of ATM cells 18 in the virtual circuit is controlled at each ATM switch 20 to approximate the behavior of the synchronous ingress network 14 and egress network 26.

Queuing of reassembled voice data bits in the playout buffer 24 reduces jitter. Although the flow of ATM cells 18 is controlled at each ATM switch 20 to approximate the behavior of the synchronous ingress network 14 and egress network 26, each switch in the ATM network 10 introduces a variable cell transmission delay. The variable delay causes the flow of cells in the ATM network to "jitter" in comparison with a perfectly synchronous connection. More particularly, jitter may cause data transmission rates inside and outside the ATM network to fail to precisely coincide. The synchronous egress network 26 is intolerant to jitter, and consequently a reservoir of data bits that are available for transmission on the egress network 26 is maintained in the playout buffer 24.

Figure 2:
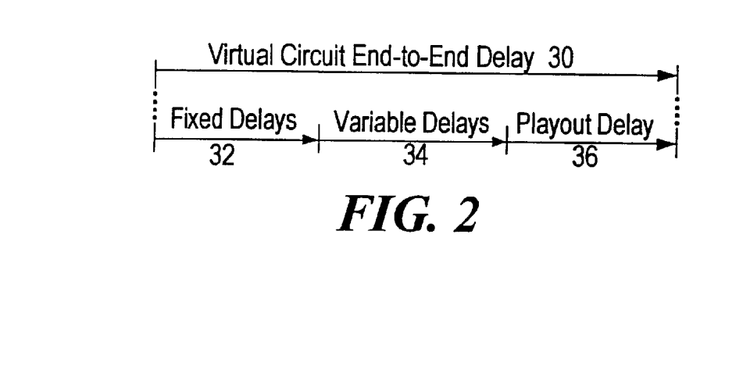
FIG. 2 is a diagram that illustrates virtual circuit end-to-end delay.

Referring now to FIGS. 1 and 2, End-to-End transmission delay 30 in a virtual circuit in the ATM network 10 is comprised of fixed delays 32, variable delays 34 and playout delay 36. The fixed delays 32 include delay associated with translating the voice data bits into ATM cells ("cell assembly delay"), delay associated with translating the ATM cells into voice data bits ("cell disassembly delay") and propagation delay determined by the physical distance between the ingress and egress networks. The playout delay is the delay caused by queuing voice data bits in the playout buffer 24. More particularly, because a reservoir of data bits is maintained in the playout buffer, there is a delay between the time at which a data bit is enqueued in the playout buffer and the time at which the queued data bit is transmitted via the synchronous egress network 26. The variable delays 34 include an output multiplexing delay and a cell transfer delay.

Figure 3:
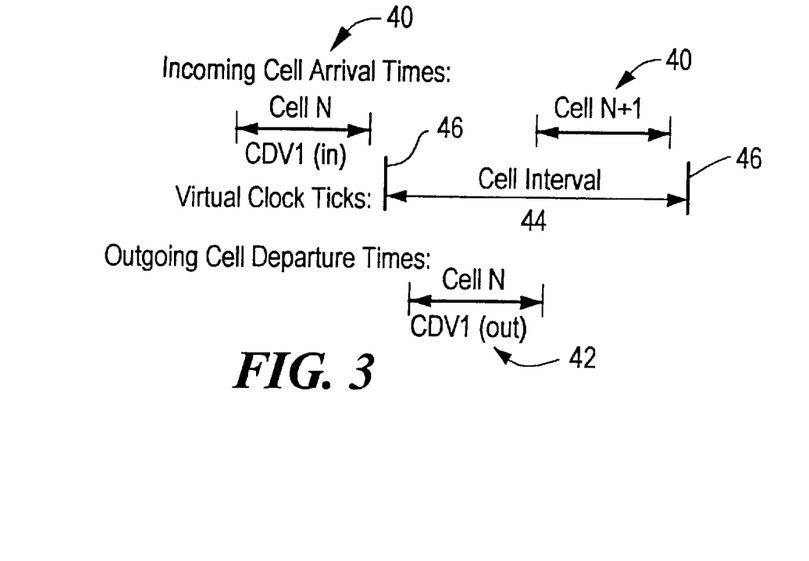
FIG. 3 is a diagram which illustrates traffic shaping.

Referring to FIGS. 1, 2 and 3, a shaping technique is employed at each ATM switch 20 to control the variable delays 34 to a substantially constant level throughout the virtual circuit. A cell N is initially received in an ATM switch 20 in a virtual circuit. Because of variable delay imposed by upstream asynchronous devices within the virtual circuit, cell N may arrive at any point within a Cell Reception Delay Variation Interval ("Reception CDVI") 40. However, regardless of the time within the Reception CDVI at which the cell arrives, the cell is transmitted during a predetermined Cell Transmission Delay Variation Interval ("Transmission CDVI") 42 which follows the end of the Reception CDVI 40. A preferred send time is at the start of the Transmission CDVI. The periodicity of the Transmission CDVI is set to be greater than or equal to the transmission rate of the circuit on the egress network. However, because of variable delay associated with transmission of the cell, the actual transmission time can be any time within the Transmission CDVI 42. Regardless of the time within the Transmission CDVI that the cell is transmitted, however, the variable delay at the next downstream ATM switch is not increased because transmission of the cell has been shaped by delaying transmission until at least the start of the Transmission CDVI 42. As a result, the required size of the playout buffer 24, which is normally about twice the variable delays at the furthest downstream ATM switch 20, is reduced. A Reception CDVI 40 for cell N+1 follows the Transmission CDVI 42 of cell N.

Figure 4:
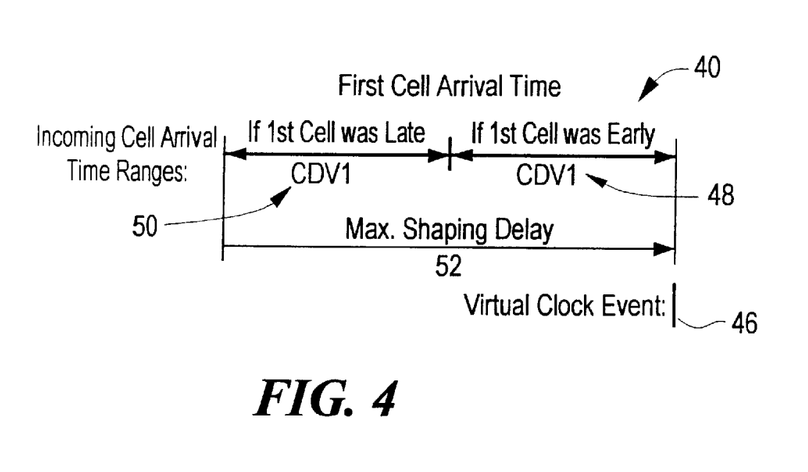
FIG. 4 is a diagram which illustrates initialization of a virtual clock.

Referring to FIGS. 3 and 4, a virtual clock is employed to designate the start of each Transmission CDVI 42. The Reception CDVI 40 and Transmission CDVI 42 are established when the connection is initialized by observing connection behavior. In particular, a plurality of cells are transmitted through the virtual circuit and cell reception times are recorded at each ATM switch for comparison. The earliest and latest arriving cells may be employed respectively to set an early cell interval 48 and a late cell interval 50, the sum of which equal the maximum shaping delay 52 for the Reception CDVI 40. Similarly, the earliest and latest transmitted cells may be employed to set intervals associated with the Transmission CDVI 42. A cell interval 44 is at least as large as the sum of the Reception CDVI 40 and the Transmission CDVI 42. The start of the cell interval 44 is set to coincide with the start of the Transmission CDVI 42. A virtual clock event ("tick") 46 triggers the start of the cell interval 44 with specified periodicity. Hence, a cell is clocked through each ATM switch in the virtual circuit after every tick 46 of the virtual clock.

Figure 5:
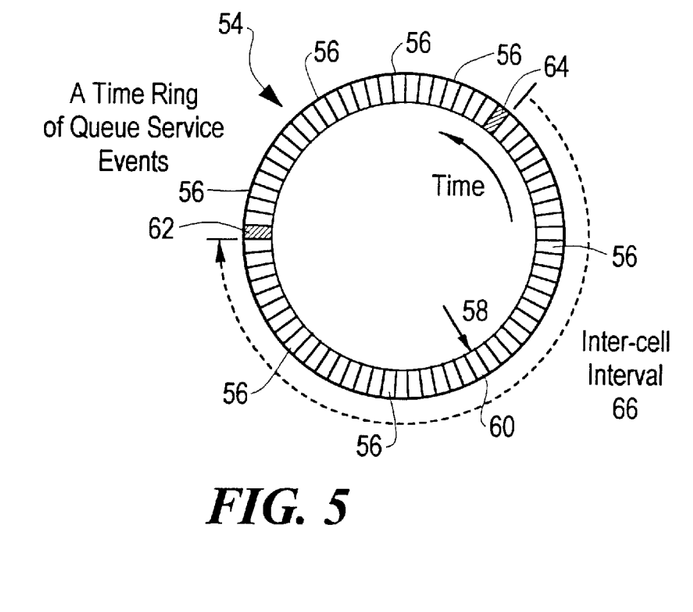
FIG. 5 is a diagram of a virtual clock time ring.

Referring to FIG. 5, the virtual clock is driven by a time ring 54. At least one cell time entry 56 in the time ring is associated with the virtual clock for a virtual circuit. Each cell time entry 56 represents a link cell time interval, and the length of the time ring 54, i.e., the total number of entries 56, is at least as long as the spacing between cells in the minimum bandwidth connection to be serviced. A pointer 58 is employed to indicate the current cell time entry 60. The pointer 58 advances with time, and as the pointer advances to a new cell time entry, the virtual clock associated with that entry "ticks" once.

The position of associated entry or entries for a virtual circuit indicates when cells are to be transmitted on that virtual circuit. For example, a virtual circuit could be associated with cell time entries 62, 64. Hence, an inter-cell transmission interval 66 for the virtual circuit is approximated by the number of entries 56 between cell time entry 62 and cell time entry 64. It will be appreciated that multiple virtual clocks can be driven by a single time ring 54.

Figure 6:
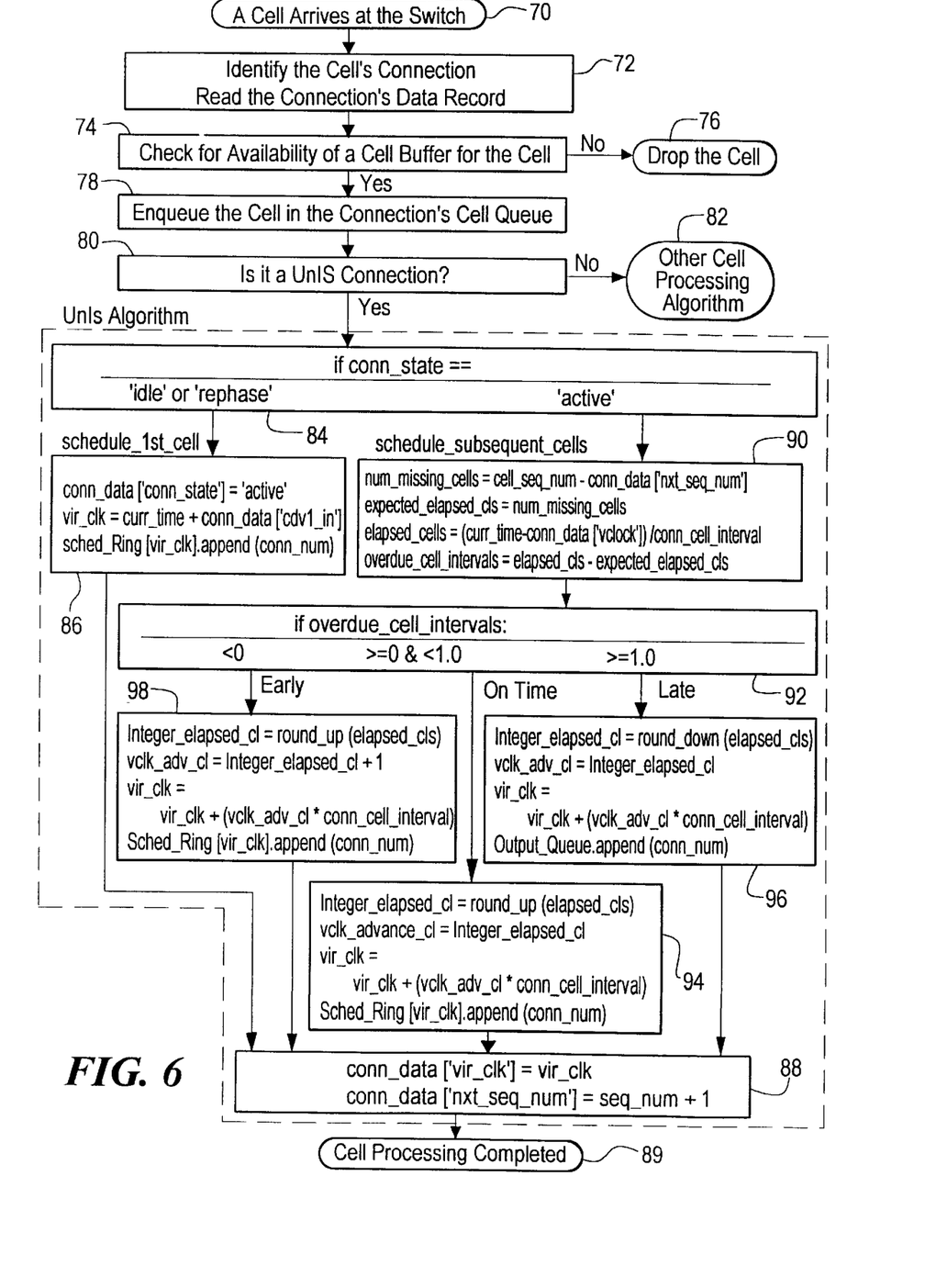
FIG. 6 is a flow diagram which illustrates the method of cell reception processing.

FIG. 6 is a flow diagram which illustrates the cell reception processing method executed independently at each switch. When a cell arrives at an ATM switch in the virtual circuit as indicated in step 70, the cell connection is identified and a connection data record is read as indicated in step 72. Subsequently, a check for availability of a cell buffer for the cell is made as indicated in step 74. If a cell buffer is not available for the cell then the cell is dropped as indicated in step 76. If a cell buffer is available for the cell then the cell is enqueued as indicated in step 78. The connection is then examined to determine if unframed isochronous shaping is to be employed, as indicated in step 80. If unframed isochronous shaping is not indicated then a non-unframed isochronous shaping algorithm is employed as indicated in step 82. If unframed isochronous shaping is indicated then an unframed isochronous shaping algorithm is implemented.

The unframed isochronous shaping algorithm controls cell flow to limit delay variation. Initially, the shaping algorithm examines the state of conn_state as indicated in step 84. If conn_state is 'idle' or 'rephase,' such as in the case of the first scheduled cell of an unestablished connection, the connection state is changed to "active" and the virtual clock is initialized as indicated in step 86. If the virtual clock drifts sufficiently relative to the circuit clock, the virtual clock is rephased in step 86. In either instance, the virtual clock is set to the current time plus an interval for jitter removal. The cell is also scheduled for transmission after the de-jitter interval. The connection data is then updated as indicated in step 88, after which cell processing is complete as indicated in step 89.

If conn_state is 'active' as determined in step 84, flow continues to step 90. As indicated in step 90, a check for missing cells is executed. A sequential cell numbering field is embedded in the ATM Adaptation Layer Type 1 ("AAL1") header of each ATM cell. The value in the field increments sequentially and eventually rolls-over, so a comparison between the present cell and the previously processed cell indicates whether any cells have been lost. A check to determine the number of missing cells is also executed, as indicated in step 90, and the number of cell intervals since the last virtual clock tick is computed. Finally, the overdue_cell_intervals value is determined for use in step 92.

As indicated in step 92, if overdue_cell_intervals is greater than or equal to 0 and less than 1, as is the case when a cell arrives on-time, flow proceeds to step 94. As indicated in step 94, the virtual clock is advanced by the elapsed time (in connection cell intervals) rounded up to the nearest integer value times the connection's inter-cell interval. The cell is then scheduled at the new virtual clock position and flow proceeds to step 88.

If overdue_cell_intervals is greater than or equal to 1, as is the case when a cell arrives late, flow proceeds from step 92 to step 96. As indicated in step 96, the virtual clock is advanced by the elapsed time (in connection cell intervals) rounded down to the nearest integer value times the connection's inter-cell interval. The cell is then enqueued on the output queue and flow proceeds to step 88.

If overdue_cell_intervals is less than 0, as is the case when a cell arrives early, flow proceeds from step 92 to step 98. As indicated in step 98, the virtual clock is advanced by the elapsed time (in connection cell intervals) rounded up to the nearest integer value plus one times the connection's inter-cell interval. The cell is then scheduled at the new virtual clock position and flow proceeds to step 88.

Figure 7:
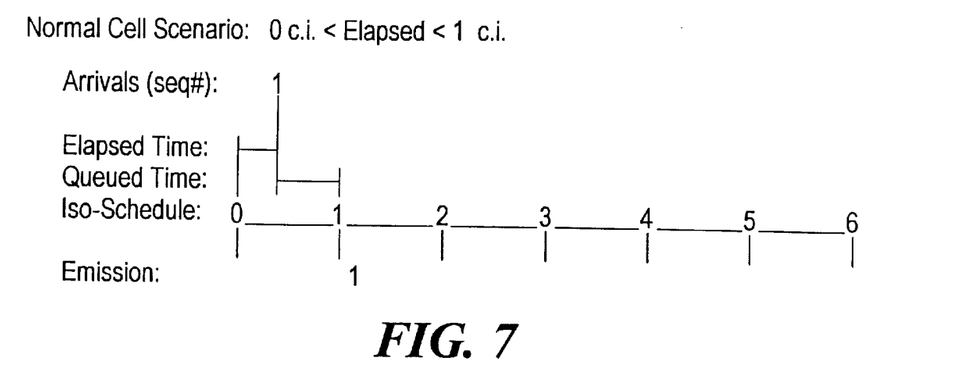
FIGS. 7–14 are time-line diagrams that illustrate cell flow shaping in different scenarios.

Referring now to FIGS. 6 and 7, the case where a cell arrives on-time will be described. Initially, a check is made to determine if any cells are missing between the previously processed cell and the cell presently being processed. Given the determination that no cells are lost, the cell arrival is compared with the Reception CDVI. If the arrival of the cell coincides with the anticipated Reception CDVI, which is Reception CDVI 0 for cell 1 in the illustrated example, then the cell is considered to be "on-time." The virtual clock is then advanced by one tick, here from position 0 to position 1, and the cell is transmitted to the next ATM switch in the virtual circuit.

Figure 8:
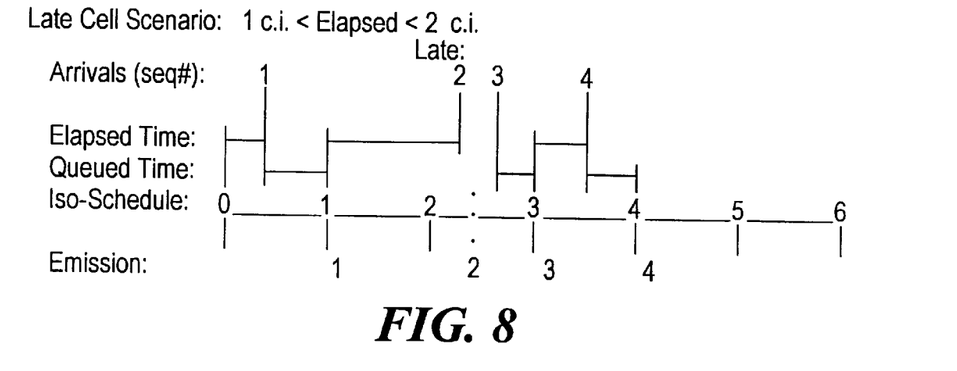

Referring now to FIGS. 6 and 8, the case where a cell arrives late will be described. As shown, "cell 2" was due in Reception CDVI 1 but arrived in Reception CDVI 2. Cell 2 is examined to determine whether cell 2 is actually the next sequential cell relative to cell 1. In the case where no cells are missing, cell 2 is forwarded directly to the output queue and the virtual clock is advanced by one tick from position 1 to position 2 so that when cell 3 arrives on time, processing can proceed in accordance with the on-time cell case.

Figure 9:
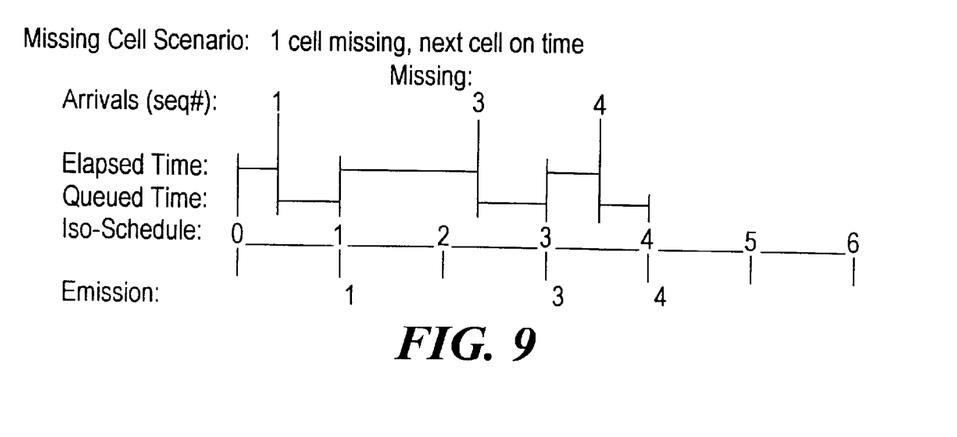

Referring now to FIGS. 6 and 9, the case where a cell is lost will be described. In the illustrated example, cell 2 is due in Reception CDVI 1 but is lost. As a result of cell 2 failing to arrive, the virtual clock is at virtual clock tick 1 when cell 3 arrives, having never been advanced by cell 2. In order for cell 3 to be transmitted at the preferred time, i.e., virtual clock tick 3, the virtual clock is advanced by two ticks from position 1 to position 3 so that cell 3 can be transmitted in accordance with the on-time cell case.

Figure 10:
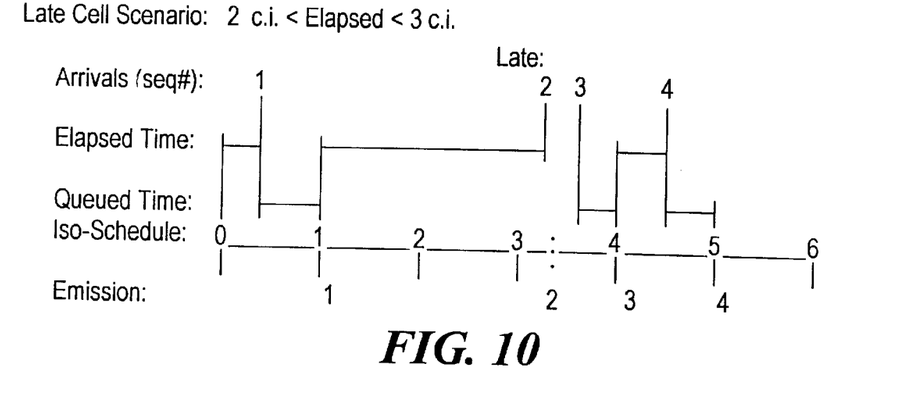

Referring now to FIGS. 6 and 10, the case where a cell arrives two Reception CDVIs late will be described. In the illustrated example cell 2 is due in Reception CDVI 1 but arrives in Reception CDVI 3. Cell 2 is examined as described above to determine whether cells are missing. In the case where no cells are missing, cell 2 is forwarded directly to the output queue and the virtual clock is advanced from position 1 to position 3 so processing proceeds in accordance with the on-time case when cell 3 arrives.

Figure 11:
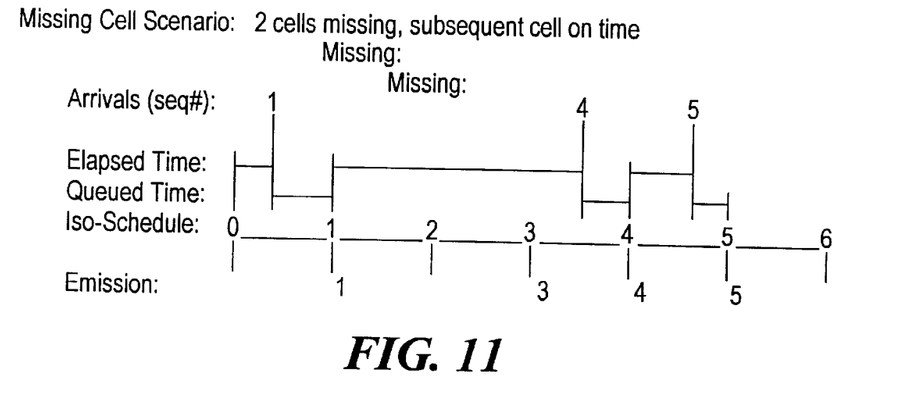

Referring now to FIGS. 6 and 11, the case where two successive cells are missing will be described. In the illustrated example cell 2 and cell 3 are lost and cell 4 arrives in the anticipated Reception CDVI. As a result of the lost cells failing to arrive, the virtual clock is at virtual clock tick 1 when cell 4 arrives because the virtual clock was not advanced by cell 2 or cell 3. Cell 4 is scheduled for transmission at virtual clock tick 4. Therefore, the virtual clock is advanced by three ticks from position 1 to position 4 so that cell 4 can be transmitted in accordance with the on-time case.

Figure 12:
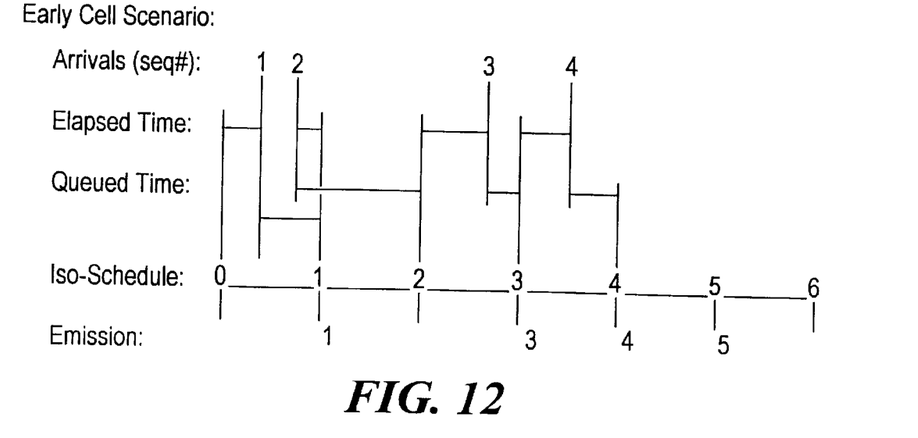

Referring now to FIGS. 6 and 12, the case in which a cell arrives early will be described. In the illustrated example cell 1 arrives in Reception CDVI one as expected, but cell 2 also arrives in Reception CDVI one. The virtual clock is at tick one, having been advanced by cell 1, which is actually later than current time. In order to allow cell 2 to be transmitted at virtual clock tick 2, the virtual clock is advanced by one tick from position 1 to position 2 so that cell 2 is transmitted on schedule.

Figure 13:
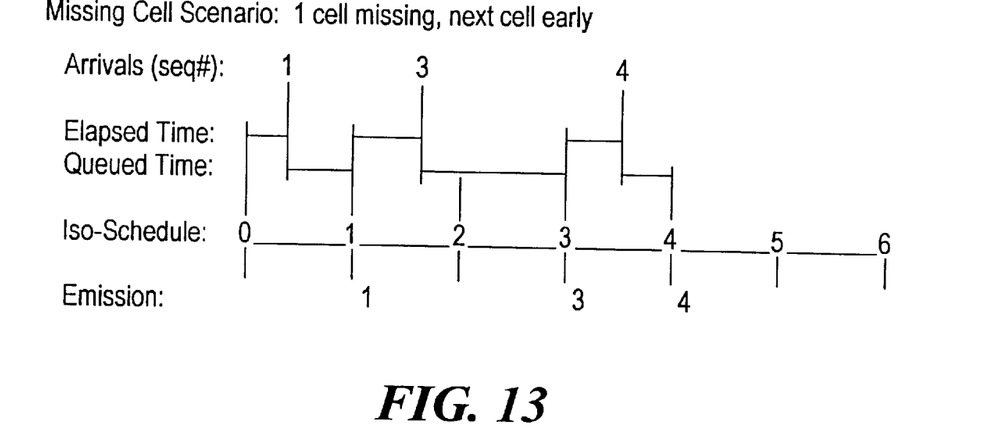

Referring now to FIGS. 6 and 13, the case where a cell is missing and the next sequential cell arrives early will be described. In the illustrated example, cell 2 is lost, cell 3 is early, and cell 4 is on time. When cell 3 arrives the virtual clock is at virtual clock tick one, having not been advanced by cell 2. Since cell 3 is scheduled for transmission at virtual clock tick three, the virtual clock is advanced by two ticks from position 1 to position 3 so that cell 3 can be transmitted on schedule.

Figure 14:
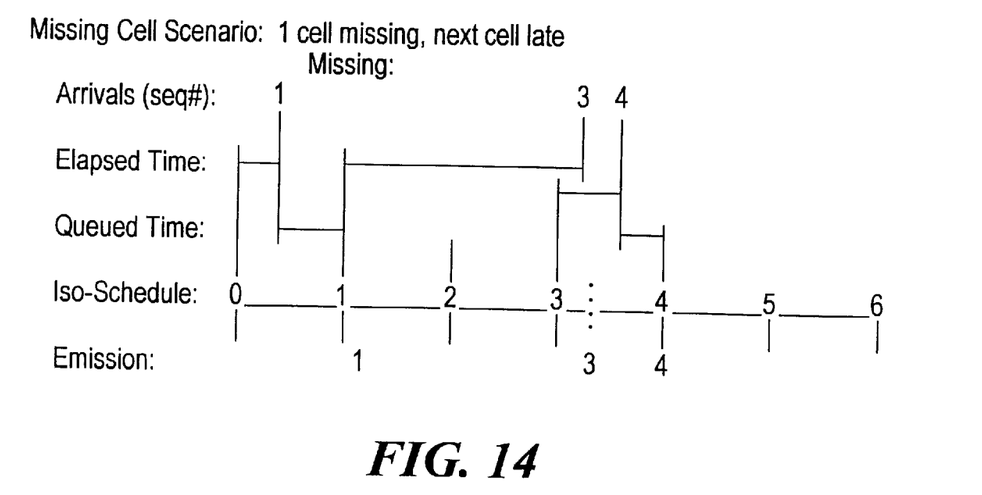

Referring now to FIGS. 6 and 14, the case where one cell is missing and the next cell arrives late will be described. In the illustrated example, cell 2 is lost, cell 3 is late and cell 4 is on time. In this case, when cell 3 arrives the virtual clock is at virtual clock tick one, having not been advanced by cell 2. Cell 3 is therefore queued directly in the output queue, having missed the time at virtual clock tick three. Further, the virtual clock is advanced by two from position 1 to position 3 so that cell 4 can be transmitted on schedule.

The shaping algorithm can be implemented as follows:

```
##########################################################
module__name =          'scheduling'
##########################################################
from __main__ import verbosity, len__sched__ring
debug = 0
#........................................................
def process__arriving__cell (
            conn__num
         .  conn__data
         .  cell__seq__num
         .  curr__time, cell__time
         .  sched__ring, sched__ring__now
         .  output__queue
      ):
```

-continued

```
        was_exceptional_event = 0
        ### The first cell . . .
        if conn_data ['state'] == 'idle' or
                    conn_data ['state'] == 'rephase':
                conn_data ['state'] = 'active'
                was_exceptional_event = scheduleL1st_cell (
                                    conn_num
                                .   conn_data
                                .   cell_seq_num
                                .   sched_ring
                                .   curr_time
                                .   sched_ring_now
            )
    ### Subsequent cells . . .
    else:
        was_exceptional_event = schedule_subsequent_cells (
                                    conn_num
                                .   conn_data
                                .   cell_seq_num
                                .   sched_ring
                                .   output-queue
                                .   curr_time
                                .   cell_time
            )
    return was_exceptional_event
#. . . . . . . . . . . . . . . . . . . . . . . . . . . . . . . . . . . . . . . . . . . . .
def schedule_1st_cell (
            conn_num, conn_data, cell_seq_num
        .   sched_ring
        .   curr_time, sched_ring_now
):
    was_exceptional_event = 0
if verbosity >= 3:
    print "\t    The Service Virtual Clock = %.6f usec"
%(
                                    conn_data ['vclock']
)
print "\t            (vclk_tslot = %d ) – (vclk_excess = %.6f
) " % (
    conn_data ['vclk_tslot'],
        conn_data ['vclk_excess'],
)
print "\t        State = %s" & 'conn_data ['state']
# Start the service virtual clock with the proper phase
offset:
conn_data ['vclock'] = curr_time + conn_data ['cdv1_in']
vclk_tslot              = sched_ring_now + conn_data
['cdv1_tslots']
vclk_excess         = conn_data ['cdv1_excess']
if verbosity >= 3:
    print "\n\t    Set the Service Virtual Clock to %.6f
usec" % (
                                    conn_data
['vclock']
)
Schedule the next service event for this connection:

sched_ring [ vclk_tslot ] .append ( conn_num )
if verbosity >= 3: print "\t    Scheduling conn %d . . ." % (
                                    conn_num,
vclk_tslot
)
conn_data ['vclk_tslot']        = vclk_tslot
conn_data ['vclk_excess']       = vclk_excess
conn_data ['nxt_cell_seq_num']  = cell_seq_num + 1
return was_exceptional_event
#. . . . . . . . . . . . . . . . . . . . . . . . . . . . . . . . . . . . . . . . . . . . .
def advance_vclk ( conn_data, cell_intervals ) :
        nxt_vclock      = conn_data ['vclock']      + (
                            cell_intervals * conn_data
['cell_interval'] )
        vclk_tslot      = conn_data ['vclk_tslot'] + (
                            cell_intervals * conn_data
['cell_inter_tslots'] )
        vclk_excess     = conn_data ['vclk_excess']  + (
                            cell_intervals          *
conn_data ['cell_inter_excess'] )
if verbosity > = 3:
        print "\n\t    Advancing the Virtual Clock frm %.6f to
```

-continued

```
%.6f usec" % (
                                conn_data      ['vclock'],
nxt_vclock
       )
       print "\t vclk_tslot    = % d c.t."% vclk_tslot
       print "\t vlck_excess   = %.6f c.t." % vclk_excess
if vclk_tslot >= len_sched_ring :
    # The tslot needs to be wrapped around to the beginning
of the ring:
    vclk_tslot = vclk_tslot – len_sched_ring
of verbosity >= 3: rint "\t vclk_tslot = %d c.t. (wrapped)"
%(
                                vclk_tslot
)
conn_data ['vclock']       = nxt_vclock
conn_data ['vclk_tslot]    = vclk_tslot
conn-data ['vclk_excess]   = vclk_excess
return vclk_tslot
# . . . . . . . . . . . . . . . . . . . . . . . . . . . . . . . . . . . . . . . . . . . . . . . . . . .
def schedule_subsequent_cells (
                       conn_num, conn_data, cell_seq_num
                     , sched_ring, output_queue
                     , curr_time, cell_time
) :
"""
was_exceptional_event = 0
if debug: print.""
num_missing_cells   = cell_seq_num   –   conn_data
['nxt_cell_seq_num']
if num_missing_cells > 0 :
    # Handle wrap-around:
    num_missing_cells = num_missing_cells + 8
expected_elapsed_ci = num_missing_cells
    # up to expected_elapsed_ci + 1.0 c.i.
if  debug:  print      "\t\expected_elapsed_ci   =   ",
expected_elapsed_ci
if num_missing_cells > 0 :
    print "\n *** MISSING CELL: expected seq# %d, received
%d." % (
                                conn_data   ['nxt_cell_seq_num'],
cell_seq_num
elapsed_time          =   curr_time – conn_data ['vclock']
elapsed_cell_intervals =     elapsed_time   /   conn_data
['cell_interval']
if  debug:  print   "\t\telapsed_cell_intervals   =   ",
elapsed_cell_intervals
is_early = 0
is_late = 0
if over_due_cell_intervals < 0.0 :
    is_early = 1
    was_exceptional_event = 1
elif over_due_cell_intervals >= 1.0 :
    is_late = 1
    was_exceptional_event = 1
if verbosity >= 3:
    print "\t The Virtual Clock = %.6f usec" % conn_data
['vclock']
    print "\t (vclk_tslot = %d ) – (vclk_excess = %.6f )"
% (
                             conn_data ['vclk_tslot'],
                                  conn_data ['vclk_excess'],
)
print "\t State = %s" % 'conn_data ['state']'
print "\t Arriving Cell Seq Num = %d % cell_seq_num
print "\t Num of missing cells = %d" % num_missing_cells
print    "\t     elapsed_cell_intervals   =   %.6f"   %
elapsed_cell_intervals
print "\t expected_elapsed_ci = %.6f % expected_elapsed_ci
if is_early :
    print "\n *** EARLY CELL: nxt_vclock %.6f < curr_time
%.6f" % (
                       (conn_data   ['vclock']   +   conn_data
['cell_interval']),
                                curr_time
)
# Round up the elapsed cell intervals:
int_elapsed_cell_intervals = int ( elapsed_cell_intervals )
if debug: print "\t\tint_elapsed_cell_intervals = %d" % (
                                int_elapsed_cell_intervals
```

```
)
fract_elapsed_ci    =    elapsed_cell_intervals
int_elapsed_cell_intervals
if fract_elapsed_ci > 0:
    int_elapsed_cell_intervals = int_elapsed_cell_intervals
+ 1
vclk_advance_ci = int_elapsed_cell_intervals + 1
# Advance the service virtual clock, both ideal and
implemented:
if verbosity >= 3: print "\t    Advancing the vclk by
cell_intervals = %d" % (
                                    vclk_advanced_ci
)
vlck_tslot = advance_vclk ( conn_data, vclk_advance_ci )
# Append conn_num to scheduling ring entry's conn_num queue:
sched_ring [ vclk_tslot ] . append (conn_num)
if verbosity >= 3: print "\t Scheduling conn %d at tslot
%d. . . " % (
                                    conn_num, vclk_tslot
)
elif is_late :
    print "\n *** LATE CELL at c.t. %d: nxt_vclock %6.f <
curr_time %.6f" % (
                            cell_time,
            (conn_data    ['vclock']    +    conn_data
['cell_interval']),
                                    curr_time
)
# Round down the elapsed cell intervals:
int_elapsed_cell_intervals = int( elapsed_cell_intervals )
if debug: print    "\t\tint_elapsed_cell_intervals = ",
int_elapsed_cell_intervals
vclk_advance_ci = int_elapsed_cell_intervals
# Advance the service virtual clock, both ideal and
implemented:
if verbosity >= 3: print "\t    Advancing the vclk by
cell_intervals = %d" % (
                                    vclk_advance_ci
)
vlck_tslot = advance_vclk ( conn_data, vlck_advance_ci )
# Append conn_num to output conn_num queue:
output_queue.append( conn_num )
if verbosity >= 3: print "\t    Queuing conn %d in output
queue. . . " % (
                                    conn_num
)
else: # is on time:
    # Round up the elapsed cell intervals:
    int_elapsed_cell_intervals = int( elapsed_cell_intervals
)
    if debug: print "\t\tint_elapsed_cell_intervals = ",
int_elapsed_cell_intervals
    fract_elapsed_ci    =    elapsed_cell_intervals –
int_elapsed_cell_intervals
    if fract_elapsed_ci > 0 :
        int_elapsed_cell_intervals =
int_elapsed_cell_intervals +1
    vclk_advance_ci = int_elapsed_cell_intervals
# Advance the service virtual clock, both ideal and
implemented:
if verbosity >= 3: print "\t Advancing the vclk by = %d c.i.
% (
)
vclk_tslot = advance_vclk ( conn_data, vlck_advance_ci )
# Append conn_num to scheduling ring entry's conn_num queue:
sched_ring [ vclk_tslot ] . append ( conn_num )
if verbosity >= 3: print "\t Scheduling conn %d at tslot
%d. . . " % (
                                    conn_num, vclk_tslot
)
conn_data ['nxt_cell_seq_num'] = cell_seq_num + 1
return was_exceptional_event
##########################################################
```

Figure 15:
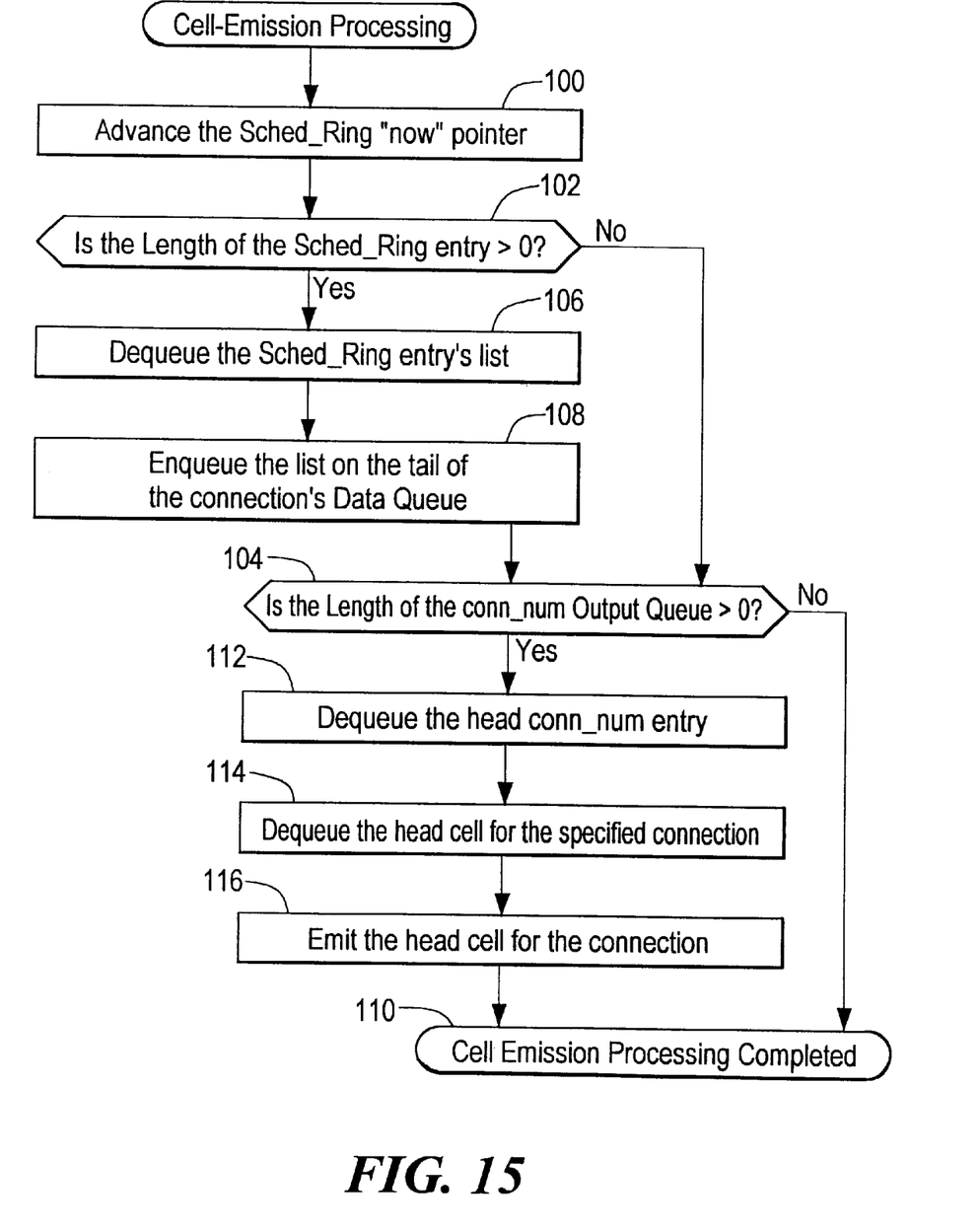
FIG. 15 is a flow diagram which illustrates the method of cell emission processing.

Cell emission processing is illustrated in FIG. 15. Initially, the Sched_Ring "now" pointer is advanced as indicated in step 100. The length of the Sched_Ring entry list is then determined to be either greater than 0 or not greater than 0 as indicated in step 102. If the length of the Sched_Ring entry list is not greater than 0 then flow continues to decision step 104. If the length of the Sched_Ring entry list is greater than 0 then the Sched_Ring entry list is dequeued as indicated in step 106. The list is then enqueued on the connection's data queue as indicated in step 108. As determined in decision step 104, if the length of the conn_num output queue is not greater than 0 then cell emission processing is completed as indicated in step 110. However, if the length of the conn_num output queue is greater than 0 as determined in step 104 then the head conn_num entry is dequeued as indicated in step 112. The head cell for the specified connection as then dequeued as indicated in step 114. The head cell for the connection is then emitted as indicated in step 116.

Having described the preferred embodiments of the invention, other embodiments which incorporate concepts of the invention will now become apparent to those skilled in the art. Therefore, the invention should not be viewed as limited to the disclosed embodiments but rather should be viewed as limited only by the spirit and the scope of the appended claims.

What is claimed is:

1. A method for transmitting at least one data unit through a virtual circuit in a network including at least first and second asynchronous devices, comprising the steps of:

in the case where a first data unit is received in the first asynchronous device within a first occurrence of a predetermined periodic receive interval, transmitting the first data unit from the first asynchronous device to the second asynchronous device within a predetermined periodic transmit interval that follows the first occurrence of the periodic receive interval;

in the case where the first data unit is received in the second asynchronous device within a second occurrence of the periodic receive interval that follows the first transmit interval, transmitting the first data unit from the second asynchronous device within a second occurrence of the periodic transmit interval that follows the second receive interval;

in the case where the first data unit is received in the second asynchronous device within an occurrence of said periodic receive interval following said second occurrence of the periodic receive interval, and wherein said first data unit was due at said second asynchronous device within said second occurrence of the periodic receive interval, forwarding the first data unit directly to an output queue and immediately advancing a virtual clock by at least one tick, wherein a beginning of each periodic transmit interval coincides with a tick of said virtual clock, whereby data unit transmission time is shaped by said first and second asynchronous devices in the virtual circuit.

2. The method of claim 1 including the further step of establishing said virtual clock with a predetermined rate of advance.

3. The method of claim 2 wherein the virtual circuit is in communication with an isochronous circuit operating at a predetermined periodic rate, and including the further step of setting the rate of advance of the virtual clock to approximate the predetermined periodic operating rate of the isochronous circuit.

4. The method of claim 3 including the further step of independently initializing the virtual clock in each asynchronous device based on the relative time of receipt of the first received data unit in a freshly set up connection.

5. The method of claim 4 including the further step of establishing each periodic receive interval relative to the virtual clock.

6. A method for transmitting at least one data unit through a virtual circuit in a network including at least first and second asynchronous devices, comprising the steps of:

in the case where a first data unit is received in the first asynchronous device within a first occurrence of a predetermined periodic receive interval, transmitting the first data unit from the first asynchronous device to the second asynchronous device within a predetermined periodic transmit interval that follows the first occurrence of the periodic receive interval;

in the case where the first data unit is received in the second asynchronous device within a second occurrence of the periodic receive interval that follows the first transmit interval, transmitting the first data unit from the second asynchronous device within a second occurrence of the periodic transmit interval that follows the second receive interval;

establishing a virtual clock having a predetermined rate of advance, the start of each respective periodic transmit interval coinciding with advance of the virtual clock; and in the case where a third data unit is due at the first asynchronous device in the first occurrence of a periodic receive interval, and where the third data unit is received in the second occurrence of the periodic receive interval, including the further step of forwarding the third data unit directly to an output queue and advancing the virtual clock by one tick, whereby data unit transmission time is shaped by said first and second asynchronous devices in the virtual circuit.

7. A method for transmitting at least one data unit through a virtual circuit in a network including at least first and second asynchronous devices, comprising the steps of:

in the case where a first data unit is received in the first asynchronous device within a first occurrence of a predetermined periodic receive interval, transmitting the first data unit from the first asynchronous device to the second asynchronous device within a predetermined periodic transmit interval that follows the first occurrence of the periodic receive interval;

in the case where the first data unit is received in the second asynchronous device within a second occurrence of the periodic receive interval that follows the first transmit interval, transmitting the first data unit from the second asynchronous device within a second occurrence of the periodic transmit interval that follows the second receive interval;

establishing a virtual clock having a predetermined rate of advance, the start of each respective periodic transmit interval coinciding with advance of the virtual clock; and in the case where a third data unit is due at the first asynchronous device in the first occurrence of a periodic receive interval and is lost, including the further step of determining that the third data unit is lost and advancing the virtual clock by two ticks, whereby data unit transmission time is shaped by said first and second asynchronous devices in the virtual circuit.

8. A method for transmitting at least one data unit through a virtual circuit in a network including at least first and second asynchronous devices, comprising the steps of:

in the case where a first data unit is received in the first asynchronous device within a first occurrence of a predetermined periodic receive interval, transmitting the first data unit from the first asynchronous device to the second asynchronous device within a predetermined periodic transmit interval that follows the first occurrence of the periodic receive interval;

in the case where the first data unit is received in the second asynchronous device within a second occurrence of the periodic receive interval that follows the first transmit interval, transmitting the first data unit from the second asynchronous device within a second occurrence of the periodic transmit interval that follows the second receive interval;

establishing a virtual clock having a predetermined rate of advance, the start of each respective periodic transmit interval coinciding with advance of the virtual clock; and in the case where a third data unit is received more than one periodic receive interval after the third data unit is due, including the further step of forwarding the third data unit directly to an output queue, determining how many receive intervals the third data unit has been overdue for and advancing the virtual clock one position for each overdue receive interval, whereby data unit transmission time is shaped by said first and second asynchronous devices in the virtual circuit.

9. A method for transmitting at least one data unit through a virtual circuit in a network including at least first and second asynchronous devices, comprising the steps of:

in the case where a first data unit is received in the first asynchronous device within a first occurrence of a predetermined periodic receive interval, transmitting the first data unit from the first asynchronous device to the second asynchronous device within a predetermined periodic transmit interval that follows the first occurrence of the periodic receive interval;

in the case where the first data unit is received in the second asynchronous device within a second occurrence of the periodic receive interval that follows the first transmit interval, transmitting the first data unit from the second asynchronous device within a second occurrence of the periodic transmit interval that follows the second receive interval;

establishing a virtual clock having a predetermined rate of advance, the start of each respective periodic transmit interval coinciding with advance of the virtual clock; and in the case where two successive data units are lost, including the further step of advancing the virtual clock by three ticks, whereby data unit transmission time is shaped by said first and second asynchronous devices in the virtual circuit.

10. A method for transmitting at least one data unit through a virtual circuit in a network including at least first and second asynchronous devices, comprising the steps of:

in the case where a first data unit is received in the first asynchronous device within a first occurrence of a predetermined periodic receive interval, transmitting the first data unit from the first asynchronous device to the second asynchronous device within a predetermined periodic transmit interval that follows the first occurrence of the periodic receive interval;

in the case where the first data unit is received in the second asynchronous device within a second occurrence of the periodic receive interval that follows the first transmit interval, transmitting the first data unit from the second asynchronous device within a second occurrence of the periodic transmit interval that follows the second receive interval;

establishing a virtual clock having a predetermined rate of advance, the start of each respective periodic transmit interval coinciding with advance of the virtual clock; and in the case where a data unit arrives early, including the further step of advancing the virtual clock by one tick, whereby data unit transmission time is shaped by said first and second asynchronous devices in the virtual circuit.

11. A method for transmitting at least one data unit through a virtual circuit in a network including at least first and second asynchronous devices, comprising the steps of:

in the case where a first data unit is received in the first asynchronous device within a first occurrence of a predetermined periodic receive interval, transmitting the first data unit from the first asynchronous device to the second asynchronous device within a predetermined periodic transmit interval that follows the first occurrence of the periodic receive interval;

in the case where the first data unit is received in the second asynchronous device within a second occurrence of the periodic receive interval that follows the first transmit interval, transmitting the first data unit from the second asynchronous device within a second occurrence of the periodic transmit interval that follows the second receive interval;

establishing a virtual clock having a predetermined rate of advance, the start of each respective periodic transmit interval coinciding with advance of the virtual clock; and in the case where a third data unit is missing and a fourth data unit arrives early, including the further step of advancing the virtual clock by two ticks, whereby data unit transmission time is shaped by said first and second asynchronous devices in the virtual circuit.

12. A method for transmitting at least one data unit through a virtual circuit in a network including at least first and second asynchronous devices, comprising the steps of:

in the case where a first data unit is received in the first asynchronous device within a first occurrence of a predetermined periodic receive interval, transmitting the first data unit from the first asynchronous device to the second asynchronous device within a predetermined periodic transmit interval that follows the first occurrence of the periodic receive interval;

in the case where the first data unit is received in the second asynchronous device within a second occurrence of the periodic receive interval that follows the first transmit interval, transmitting the first data unit from the second asynchronous device within a second occurrence of the periodic transmit interval that follows the second receive interval;

establishing a virtual clock having a predetermined rate of advance, the start of each respective periodic transmit interval coinciding with advance of the virtual clock; and in the case where a third data unit is missing and a fourth data unit arrives late, including the further step of queuing the fourth data unit directly in an output queue and advancing the virtual clock by two ticks, whereby data unit transmission time is shaped by said first and second asynchronous devices in the virtual circuit.

13. An asynchronous network switching device for transmitting at least one data unit through a virtual circuit in a network including at least one downstream asynchronous device, comprising:

at least one input port for receiving the data unit;

at least one output port for transmitting the data unit; and a shaping circuit operative in the case where a first data unit is received in one of the at least one input ports within a first occurrence of a predetermined periodic receive interval to cause transmission of the first data unit from one of the at least one output ports to one of the at least one downstream switches within a predetermined periodic transmit interval that follows the first occurrence of the periodic receive interval, wherein said shaping circuit is further operative, in the case where the first data unit is received within an occurrence of said periodic receive interval following said first occurrence of the periodic receive interval, and wherein said first data unit was due within said first occurrence of the periodic receive interval, to forward the first data unit directly to an output queue and immediately advance a virtual clock by at least one tick, wherein a beginning of each periodic transmit interval coincides with a tick of said virtual clock.

14. The asynchronous device of claim 13 wherein said virtual clock is responsive to a predetermined rate of advance.

15. The asynchronous device of claim 14 wherein the virtual circuit is in communication with an isochronous circuit operating at a predetermined periodic rate, and wherein the rate of advance of the virtual clock closely approximates the predetermined periodic operating rate of the isochronous circuit.

16. The asynchronous device of claim 15 wherein the virtual clock is independently initialized in each asynchronous device based on the relative time of receipt of the first received data unit in a freshly set up connection.

17. The asynchronous device of claim 16 wherein each periodic receive interval is established relative to the virtual clock.

18. An asynchronous network switching device for transmitting at least one data unit through a virtual circuit in a network including at least one downstream asynchronous device, comprising:

at least one input port for receiving the data unit;

at least one output port for transmitting the data unit;

a shaping circuit operative in the case where a first data unit is received in one of the at least one input ports within a first occurrence of a predetermined periodic receive interval to cause transmission of the first data unit from one of the at least one output ports to one of the at least one downstream switches within a predetermined periodic transmit interval that follows the first occurrence of the periodic receive interval;

a virtual clock having a predetermined rate of advance, the start of each respective periodic transmit interval coinciding with advance of the virtual clock; and wherein, in the case where a third data unit is due at the asynchronous device in the first occurrence of a periodic receive interval, and where the third data unit is received in the second occurrence of the periodic receive interval, the shaping device causes the third data unit to be forwarded directly to an output queue and advances the virtual clock one tick.

19. An asynchronous network switching device for transmitting at least one data unit through a virtual circuit in a network including at least one downstream asynchronous device, comprising:

at least one input port for receiving the data unit;

at least one output port for transmitting the data unit;

a shaping circuit operative in the case where a first data unit is received in one of the at least one input ports within a first occurrence of a predetermined periodic receive interval to cause transmission of the first data unit from one of the at least one output ports to one of the at least one downstream switches within a predetermined periodic transmit interval that follows the first occurrence of the periodic receive interval;

a virtual clock having a predetermined rate of advance, the start of each respective periodic transmit interval coinciding with advance of the virtual clock; and wherein, in the case where a third data unit is due at the asynchronous device in the first occurrence of a periodic receive interval and is lost, the shaping circuit determines that the third data unit is lost and advances the virtual clock by two ticks.

20. An asynchronous network switching device for transmitting at least one data unit through a virtual circuit in a network including at least one downstream asynchronous device, comprising:

at least one input port for receiving the data unit;

at least one output port for transmitting the data unit;

a shaping circuit operative in the case where a first data unit is received in one of the at least one input ports within a first occurrence of a predetermined periodic receive interval to cause transmission of the first data unit from one of the at least one output ports to one of the at least one downstream switches within a predetermined periodic transmit interval that follows the first occurrence of the periodic receive interval;

a virtual clock having a predetermined rate of advance, the start of each respective periodic transmit interval coinciding with advance of the virtual clock; and wherein, in the case where a third data unit is received more than one periodic receive interval after the third data unit is due, the shaping device causes the third data unit to be forwarded directly to an output queue and determines how many receive intervals the third data unit has been overdue for and advances the virtual clock one position for each overdue receive interval.

21. An asynchronous network switching device for transmitting at least one data unit through a virtual circuit in a network including at least one downstream asynchronous device, comprising:

at least one input port for receiving the data unit;

at least one output port for transmitting the data unit;

a shaping circuit operative in the case where a first data unit is received in one of the at least one input ports within a first occurrence of a predetermined periodic receive interval to cause transmission of the first data unit from one of the at least one output ports to one of the at least one downstream switches within a predetermined periodic transmit interval that follows the first occurrence of the periodic receive interval;

a virtual clock having a predetermined rate of advance, the start of each respective periodic transmit interval coinciding with advance of the virtual clock; and wherein, in the case where two successive data units are lost, the shaping circuit advances the virtual clock by three ticks.

22. An asynchronous network switching device for transmitting at least one data unit through a virtual circuit in a network including at least one downstream asynchronous device, comprising:

at least one input port for receiving the data unit;

at least one output port for transmitting the data unit;

a shaping circuit operative in the case where a first data unit is received in one of the at least one input ports within a first occurrence of a predetermined periodic receive interval to cause transmission of the first data unit from one of the at least one output ports to one of the at least one downstream switches within a predetermined periodic transmit interval that follows the first occurrence of the periodic receive interval;

a virtual clock having a predetermined rate of advance, the start of each respective periodic transmit interval coinciding with advance of the virtual clock; and wherein, in the case where a data unit arrives at the asynchronous device early, the shaping circuit advances the virtual clock by one tick.

23. An asynchronous network switching device for transmitting at least one data unit through a virtual circuit in a network including at least one downstream asynchronous device, comprising:

at least one input port for receiving the data unit;

at least one output port for transmitting the data unit;

a shaping circuit operative in the case where a first data unit is received in one of the at least one input ports within a first occurrence of a predetermined periodic receive interval to cause transmission of the first data unit from one of the at least one output ports to one of the at least one downstream switches within a predetermined periodic transmit interval that follows the first occurrence of the periodic receive interval;

a virtual clock having a predetermined rate of advance, the start of each respective periodic transmit interval coinciding with advance of the virtual clock; and wherein, in the case where a third data unit is missing and a fourth data unit arrives early, the shaping circuit advances the virtual clock by two ticks.

24. An asynchronous network switching device for transmitting at least one data unit through a virtual circuit in a network including at least one downstream asynchronous device, comprising:

at least one input port for receiving the data unit;

at least one output port for transmitting the data unit;

a shaping circuit operative in the case where a first data unit is received in one of the at least one input ports within a first occurrence of a predetermined periodic receive interval to cause transmission of the first data unit from one of the at least one output ports to one of the at least one downstream switches within a predetermined periodic transmit interval that follows the first occurrence of the periodic receive interval;

a virtual clock having a predetermined rate of advance, the start of each respective periodic transmit interval coinciding with advance of the virtual clock; and wherein, in the case where a third data unit is missing and a fourth data unit arrives late, the shaping circuit queues the fourth data unit directly in an output queue and advances the virtual clock by two ticks.

\* \* \* \* \*